US00RE37129E

(19) United States
(12) Reissued Patent
Chow

(10) Patent Number: US RE37,129 E
(45) Date of Reissued Patent: Apr. 10, 2001

(54) DISPLAY PACK HAVING A ROTATABLE SECURITY MEMBER

(75) Inventor: Jessie Chow, Taichung (TW)

(73) Assignee: Hand Tool Design Corporation, Wilmington, DE (US)

(21) Appl. No.: 09/326,731

(22) Filed: Jun. 4, 1999

Related U.S. Patent Documents

Reissue of:
(64) Patent No.: 5,785,174
Issued: Jul. 28, 1998
Appl. No.: 08/879,225
Filed: Jun. 19, 1997

(51) Int. Cl.[7] ..... A45C 11/26
(52) U.S. Cl. ..... 206/349; 206/376; 206/346; 206/371; 206/493
(58) Field of Search ..... 206/349, 376, 206/377, 461, 471, 493, 495; 211/70.6; 248/309.1

(56) References Cited

U.S. PATENT DOCUMENTS

| | | | | |
|---|---|---|---|---|
| 3,516,585 | * | 6/1970 | Inwood | 206/349 |
| 4,056,190 | * | 11/1977 | Dix | 206/471 |
| 4,407,413 | | 10/1983 | Jansson . | |
| 4,872,551 | * | 10/1989 | Theros | 206/349 |
| 4,997,085 | * | 3/1991 | Brennam | 206/376 |
| 5,595,295 | * | 1/1997 | Lin | 206/349 |
| 5,713,467 | * | 2/1998 | Kao | 206/349 |

FOREIGN PATENT DOCUMENTS

| | | | | |
|---|---|---|---|---|
| 4117705 | | 12/1992 | (DE) . | |
| 2652064 | * | 3/1991 | (FR) | 206/349 |
| 2187714 | * | 9/1987 | (GB) | 206/349 |

* cited by examiner

*Primary Examiner*—David T. Fidei
(74) *Attorney, Agent, or Firm*—Alan Kamrath Oppenheimer Wolff & Donnelly LLP

(57) ABSTRACT

A display pack having a rotatable security member includes a board and the rotatable security member wherein the board has a first hole and a second hole respectively defined therein and an inverted U-shaped frame extends perpendicularly from a front surface of the board with the second hole being located between two extending portions of the inverted U-shaped frame. The second hole has a toothed inner periphery and the rotatable security member includes a polygonal head and a shank which has a flange extending from a free end thereof and a toothed periphery defined in an outer periphery near the flange so that the rotatable security member is rotatably inserted into the second hole with the toothed inner periphery engaged with the toothed inner periphery. A ratchet tool is engaged with the rotatable security member and can be operated within a limited angle between the two extending portions of the frame.

18 Claims, 6 Drawing Sheets

DISPLAY PACK HAVING A ROTATABLE SECURITY MEMBER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a display pack and, more particularly, to an improved display pack having a rotatable security member disposed thereto so that a ratchet tool is operatably engaged to the security member.

2. Brief Description of the Prior Art

Hardware stores use display packs to display tools on walls, and these tool display packs each have a simple structure and can be hung on the hook so that the tool is fixedly connected to the display pack by way of mounting a transparent cover to the display pack with the tool received between the cover and the display pack. Generally, the conventional display pack provides [an] *a* main advantage [is] that customers can see the whole configuration of the tool. An inherent shortcoming of the tool display pack is that the tool, such as a ratchet tool, cannot be operated by customers. Furthermore, [each of the] each of the tools [have] *has* to be transported to a packing plant to be packed in display packs, and this requires a high cost.

Another type of display [packs include] *pack includes* a board portion and a ring member disposed to the board so that a tool is simply supported and wrapped by the ring member. However, this type of display [packs are] *pack is* easily broken simply by pulling the tool to break the ring member. Therefore, a thief can remove the tool and conceal it about his person.

The present invention intends to provide an improved display pack to mitigate and/or obviate the above-mentioned problems.

SUMMARY OF THE INVENTION

The present invention provides a display pack and comprises a board and a rotatable security member. The board has a first hole and a second hole respectively defined therethrough, wherein the second hole has a toothed inner periphery. An inverted U-shaped frame extends perpendicularly from a front surface thereof, with the second hole being located between two extending portions of the frame. The rotatable security member includes a polygonal head and a shank extending from the head. The shank has a least one flange extending radially from a free end thereof and a toothed periphery defined in an outer periphery thereof near the flange such that the rotatable security member is rotatably inserted into the second hole with the toothed periphery being engaged with the toothed inner periphery.

It is an object of the present invention to provide a display pack which has a rotatable security member disposed thereto which is cooperated with a ratchet tool such that the ratchet tool can be operated within a [limit] *limited* angle.

It is another object of the present invention to provide *a* display pack having a rotatable security member disposed thereto so as to prevent the tool engaged with the rotatable security member from being taken away from the display pack without permission.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
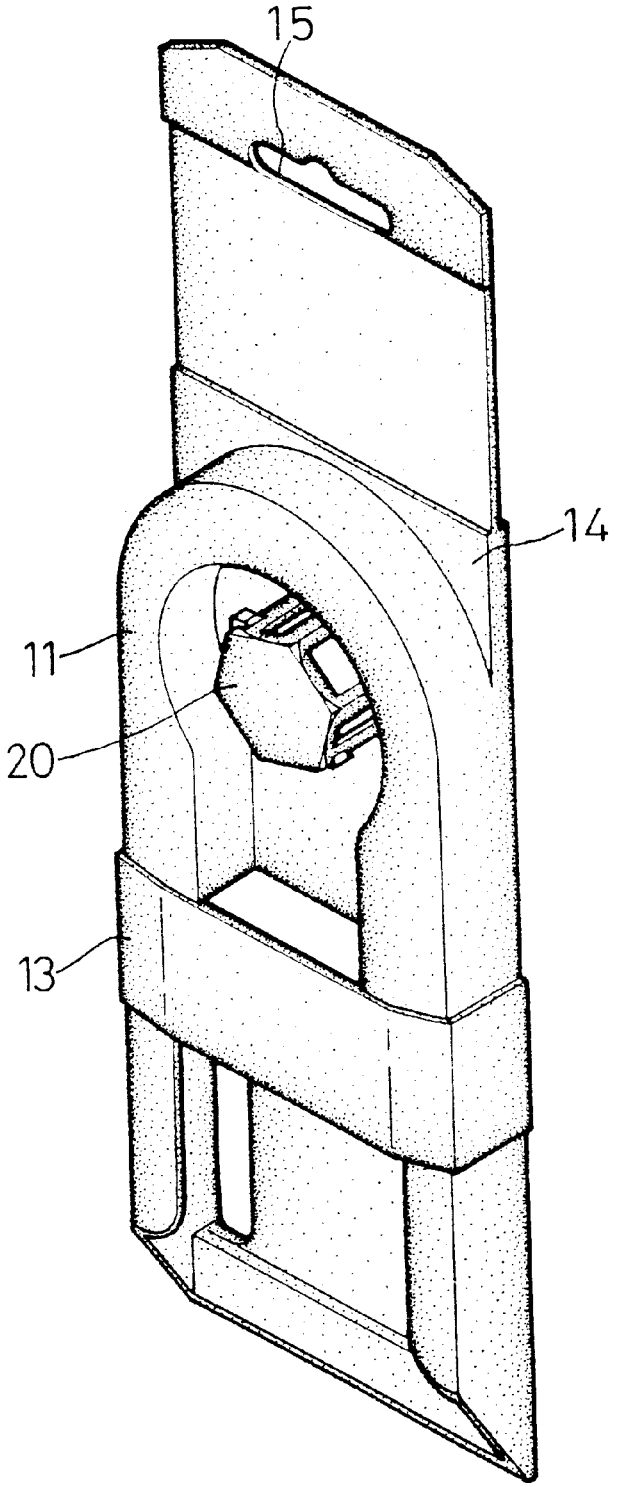
FIG. 1 is a perspective view of a display pack having a rotatable security member in accordance with the present invention.
Figure 2:
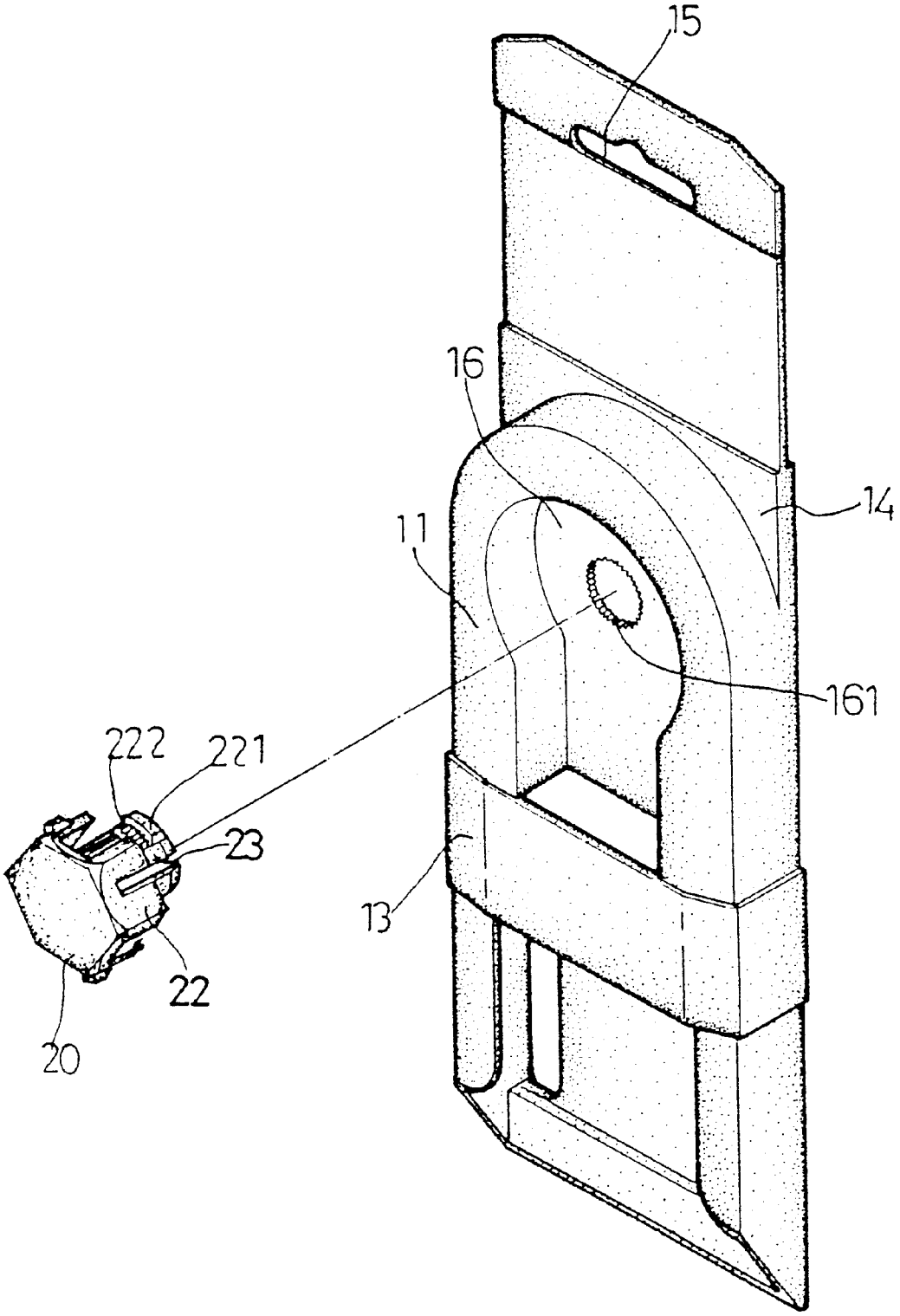
FIG. 2 is an exploded view of the display pack and the rotatable security member in accordance with the present invention.
Figure 3:
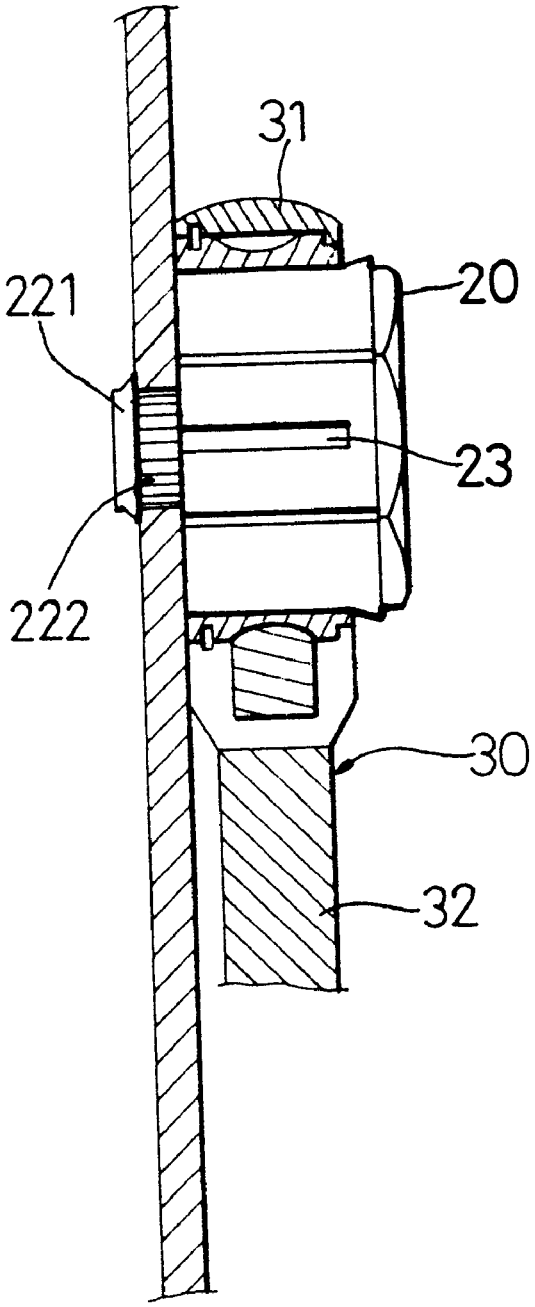
FIG. 3 is a side elevational view, partly in section, of the display pack with a ratchet tool being engaged with the rotatable security member.

Referring to the drawings and initially to FIGS. 1 through 3, a display pack in accordance with the present invention generally includes a board 14 and a rotatable security member 20 wherein the board 14 has a first hole 15 defined in a position near a top area thereof so as to be hung on a rack (not shown) for example and a second hole 16 defined in a position near a middle portion thereof. The second hole 16 has a toothed inner periphery 161. The board 14 has an inverted U-shaped frame 11 extending perpendicularly from a front surface thereof with the second hole 16 being located between two extending portions of the frame 11 and a limit plate 13 is connected between the two extending portions of the inverted U-shaped frame 11.

The rotatable security member 20 includes a polygonal head [21] *22*, a hexagonal head in this embodiment, and a shank [22] extending from one of two sides of the head [21] *22*. The shank [22] has at least one flange 221 extending radially from a free end thereof and at least two slits 23 defined longitudinally therein which open to the free end. The flange 221 has a diameter slightly larger than that of the second hole 16 so that the flange 221 is engaged with a rear surface of the board 14 when the shank [22] of the rotatable security member 20 is inserted into the second hole 16 by force. A toothed periphery 222 is defined in an outer periphery of the shank [22] and is located near the flange 221 such that the rotatable security member 20 is rotatably inserted into the second hole 16 with the toothed periphery 222 being engaged with the toothed inner periphery 161. It is noted that the toothed periphery 222 and the toothed inner periphery 161 are made by plastic and have small teeth so that the rotatable security member 20 is rotatable in the second hole 16 with the toothed periphery 222 shifting on the toothed inner periphery 161.

Figure 4:
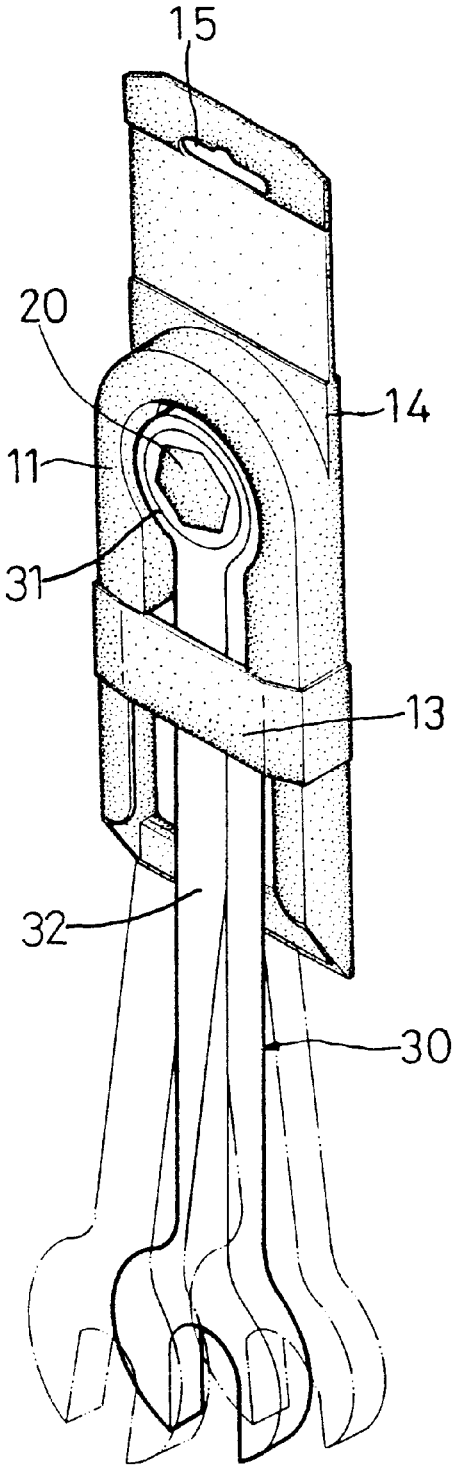
FIG. 4 is an illustrative view to show the ratchet tool engaged with the rotatable security member [is] *and* operated [with] *within* a limited angle.

Further referring to FIG. 4, a ratchet tool 30 has its operation head portion 31 mounted to the rotatable security member 20 and its shank portion 32 extending between the two extending portions of the inverted U-shaped frame 11 such that a customer (not shown) can operate the ratchet tool 30 by swinging the shank portion 32 of the ratchet tool 30. The relationship mentioned above between the toothed periphery 222 and the toothed inner periphery 161 will cause the ratchet tool 30 to be operated as if it is fastening or unfastening an object.

Accordingly, the present invention allows customers to operate the ratchet tool 30 attached to the display pack in accordance with the present invention and the ratchet tool 30 is easily [to be] attached to the display pack.

Figure 5:
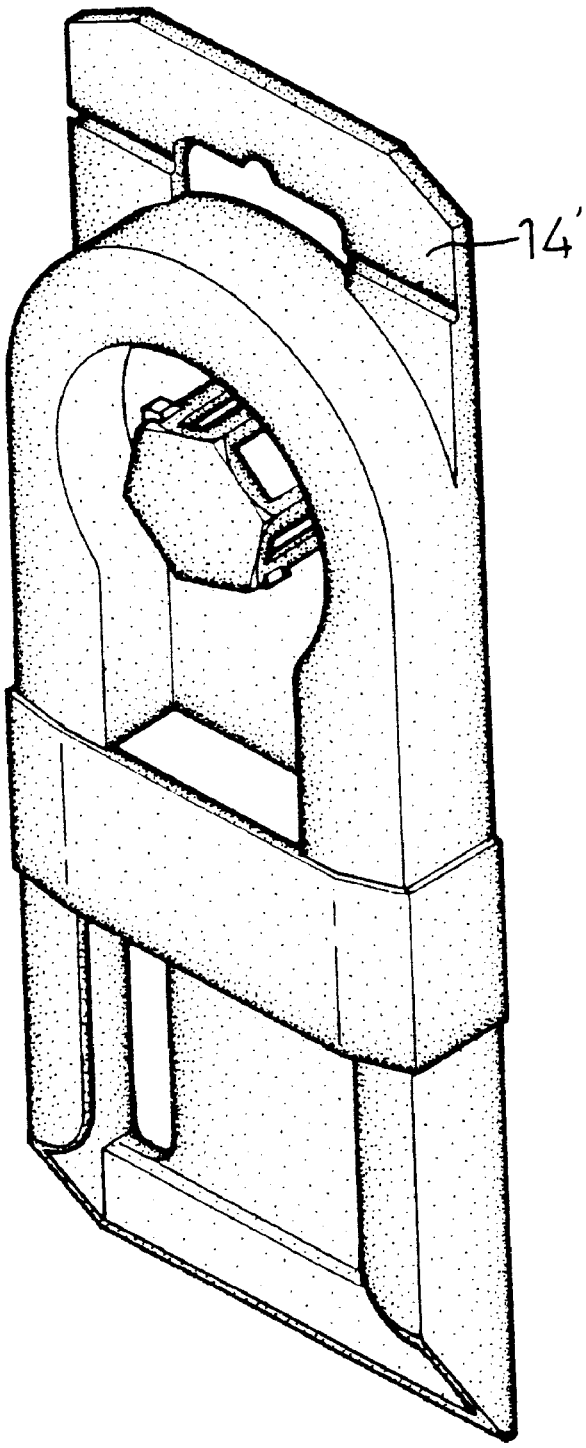
FIG. 5 is a perspective view of another embodiment of the display pack having a rotatable security member in accordance with the present invention.
Figure 6:
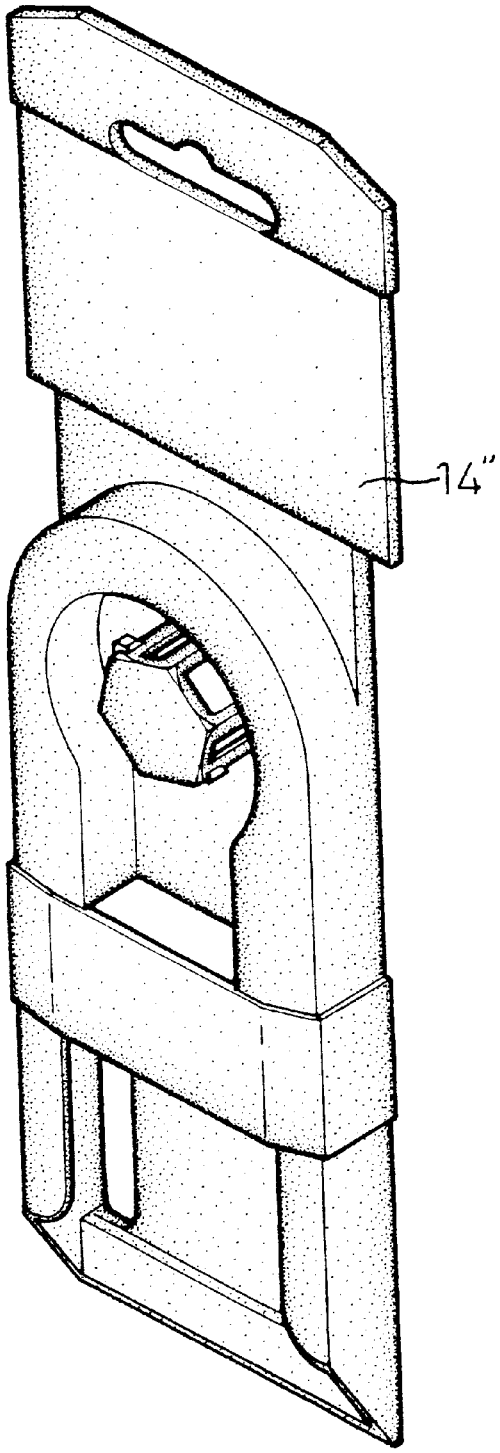
FIG. 6 is a perspective view of yet another embodiment of the display pack having a rotatable security member in accordance with the present invention.

FIGS. 5 and 6 respectively show different embodiments of the display pack in accordance with the present invention with a shorter board 14' and a longer board 14".

Although the invention has been explained in relation to its preferred embodiment, it is to be understood that many other possible modifications and variations can be made without departing from the spirit and scope of the invention as hereinafter claimed.

What is claimed is:

1. A display pack comprising:

a board having a first hole and a second hole respectively defined therethrough, said second hole having a toothed inner periphery, said board having an inverted U-shaped frame extending perpendicularly from a front surface thereof with said second hole being located between two extending portions of said frame, and a rotatable security member including a polygonal head and a shank extending from one of two sides of said head, said shank having at least one flange extending radially from a free end thereof and a toothed periphery defined therein near said flange such that said rotatable security member is rotatably inserted into said second hole with said toothed periphery being engaged with said toothed inner periphery.

2. The display pack as claimed in claim 1 wherein said flange has a diameter slightly larger than that of said second hole so that said shank is force-fitted into said second hole with said flange being engaged with a rear surface of said board.

3. The display pack as claimed in claim 1 wherein a limit plate is connected between said two extending portions of said inverted U-shaped frame.

4. The display pack as claimed in claim 1 wherein at least two slits are defined longitudinally in said shank and open to said free end of said shank.

*5. A display pack comprising:*

*a board having a hole defined therethrough, said hole having a toothed inner periphery, and*

*a rotatable security means including a polygonal head and a shank extending from one of two sides of said head, said shank having at least one flange extending radially from a free end thereof and a toothed periphery defined therein near said flange such that said rotatable security member is rotatably inserted into said hole with said toothed periphery being engaged with said toothed inner periphery.*

*6. The display pack as claimed in claim 5, wherein said board has a frame formed on a front surface thereof, and said hole is enclosed by said frame.*

*7. The display pack as claimed in claim 6, wherein the frame is of a inverted U-shape and extends perpendicularly from a front surface of the board, the inverted U-shaped frame including two extending portions between which the hole is located.*

*8. The display pack as claimed in claim 7, further comprising a limit plate connected between the extending portions of the inverted U-shaped frame.*

*9. The display pack as claimed in claim 5, wherein the board further comprises a second hole.*

*10. The display pack as claimed in claim 5, wherein said flange has a diameter slightly larger than that of the hole so that said shank is force-fitted into said hole with said flange engaged with a rear surface of said board.*

*11. The display pack as claimed in claim 5, wherein at least two slits are defined longitudinally in said shank and open to said free end of said shank.*

*12. A display pack for a tool comprising:*

*a board, and*

*means for operably engaging with a portion of the tool, with the operably engaging means being rotatably mounted to the board, whereby the tool is rotatable together with the operably engaging means relative to the board;*

*wherein the rotatably engaging means includes a hole defined in the board, said hole having a toothed inner periphery, and*

*a rotatable security means including a polygonal head and a shank extending from one of two sides of said head, said shank having at least one flange extending radially from a free end thereof and a toothed periphery defined therein near said flange such that said rotatable security means is rotatably inserted into said hole with said toothed periphery being engaged with said toothed inner periphery of the hole.*

*13. The display pack as claimed in claim 12, wherein said board has a frame formed on a front surface thereof, and said hole is enclosed by said frame.*

*14. The display pack as claimed in claim 13, wherein the frame is of an inverted U-shape and extends perpendicularly from a front surface of the board, the inverted U-shaped frame including two extending portions between which the hole is located.*

*15. The display pack as claimed in claim 14, further comprising a limit plate connected between the extending portions of the inverted U-shaped frame.*

*16. The display pack as claimed in claim 12, wherein the board further comprises a second hole.*

*17. The display pack as claimed in claim 12, wherein said flange has a diameter slightly larger than that of the hole so that said shank is force-fitted into said hole with said flange engaged with a rear surface of said board.*

*18. The display pack as claimed in claim 12, wherein at least two slits are defined longitudinally in said shank and open to said free end of said shank.*

* * * * *